US009288307B2

(12) United States Patent
Jung et al.

(10) Patent No.: US 9,288,307 B2
(45) Date of Patent: Mar. 15, 2016

(54) AUTHORIZED TRANSMISSION OF NAVIGATION ASSISTANCE

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 1856 days.

(21) Appl. No.: 11/897,961

(22) Filed: Aug. 31, 2007

(65) Prior Publication Data

US 2009/0061793 A1    Mar. 5, 2009

(51) Int. Cl.
*H04W 4/02* (2009.01)
*H04L 29/08* (2006.01)
*H04M 1/725* (2006.01)

(52) U.S. Cl.
CPC ............ *H04M 1/72572* (2013.01); *H04L 67/18* (2013.01); *H04W 4/02* (2013.01); *H04W 4/023* (2013.01)

(58) Field of Classification Search
CPC ....... H04W 4/02; H04W 4/023; H04W 4/025; H04L 67/18; H04L 67/22; H04L 67/24; H04M 2242/03; H04M 3/42348
USPC ..................... 455/401.1–401.2, 414.1–414.3, 455/456.1–457, 466
See application file for complete search history.

(56) References Cited

U.S. PATENT DOCUMENTS

| 7,519,376 | B2* | 4/2009 | Chang ........................ 455/456.3 |
| 7,742,774 | B2* | 6/2010 | Oh et al. ..................... 455/456.1 |
| 2002/0169539 | A1* | 11/2002 | Menard et al. ................ 701/200 |
| 2005/0227676 | A1* | 10/2005 | De Vries .................... 455/414.1 |
| 2006/0030339 | A1* | 2/2006 | Zhovnirovsky et al. ... 455/456.6 |
| 2006/0223518 | A1* | 10/2006 | Haney ............................ 455/420 |
| 2008/0155257 | A1* | 6/2008 | Werner et al. ................. 713/168 |

OTHER PUBLICATIONS

"Customer Support Knowledge Library Bluetooth Pairing: definition and overview"; palm.com; pp. 1-2; printed on Aug. 22, 2007; located at http://kb.palm.com/SRVS/CGI-BIN/WEBCGI.EXE/,/?St=58,E=000 . . . .
"Preposition of Spatial Relationship"; Owl Online Writing Lab; bearing dates of 1995-2004; pp. 1-4; Purdue University; printed on Aug. 22, 2007; located at http://owl.english.purdue.edu/handouts/print/esl/eslprep3.html.
"Rino 520"; Garmin; bearing dates of 1996-2007; pp. 1-2; printed on Aug. 29, 2007; located at https://buy.garmin.com/shop/shop.do?pID=6406&tab=rino520.

(Continued)

*Primary Examiner* — George Eng
*Assistant Examiner* — Marcus Hammonds

(57) ABSTRACT

Embodiments provide an apparatus, a system, a device, and a method. A method includes automatically providing data indicative of a location of a first mobile wireless communications device from the first mobile wireless communications device to a second mobile wireless communications device in response to respective human-user imitated authorizations exchanged between the two mobile wireless communications devices.

32 Claims, 14 Drawing Sheets

(56) References Cited

OTHER PUBLICATIONS

"Unit 12—Relationships Among Spatial Objects"; bearing a date of Aug. 30, 1997; pp. 1-8; University of British Columbia; printed on Aug. 22, 2007; located at http://www.geog.ubc.ca/courses/klink/gis.notes/ncgia/u12.html.

U.S. Appl. No. 11/900,642, Edward K.Y. Jung et al.

* cited by examiner

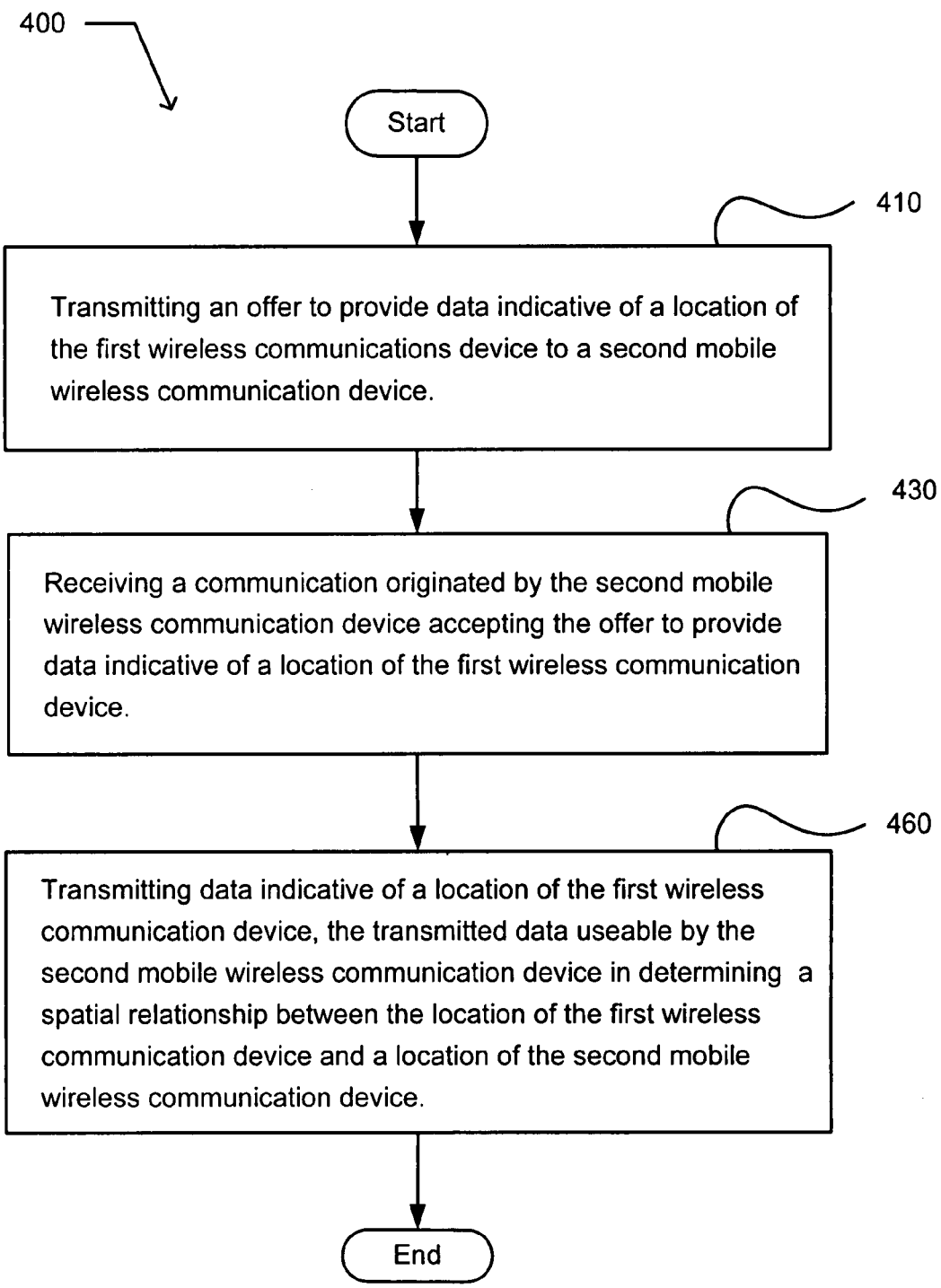

FIG. 6

410 — Transmitting an offer to provide data indicative of a location of the first wireless communications device to a second mobile wireless communication device.

412 Transmitting in response to an authorization input received from a human user of the first wireless communication device an offer to provide data indicative of a location of the first wireless communications device to a second mobile wireless communication device.

414 Transmitting from a first mobile wireless communications device an offer to provide data indicative of a location of the first mobile wireless communications device to a second mobile wireless communication device.

416 Transmitting from a first wireless communications device an indication of availability to provide data indicative of a location of the first wireless communications device to a second mobile wireless communication device.

418 Transmitting from a first positioning-enabled wireless communications device an offer to provide data indicative of a location of the first wireless communications device to a second mobile wireless communication device.

422 Transmitting an offer to provide data indicative of a location of the first wireless communications device to a second mobile wireless communication device and to a third mobile wireless communications device.

Receiving a communication originated by the second mobile wireless communication device accepting the offer to provide data indicative of a location of the first wireless communication device, the transmitted data useable by the second mobile wireless communication device in determining a spatial relationship between the location of the first wireless communication device and a location of second mobile wireless communication device.

---

462 Transmitting data indicative of a position, a route, a speed, and/or a direction of the first wireless communication device.

464 Transmitting data indicative of an at least substantially stationary location, or a moving location of the first wireless communication device.

466 Transmitting data indicative of a location of the first wireless communication device, the transmitted data useable by the second mobile wireless communication device in displaying information indicative of a spatial relationship between the location of the first wireless communication device and a location of the second mobile wireless communication device.

468 Transmitting data indicative of a location of the first wireless communication device, the transmitted data useable by the second wireless communication device in generating information usable in directing at least one of a person, vehicle, craft, or plane associated with the second mobile wireless communication device to a location proximate to the location of the first wireless communication device.

472 Transmitting data indicative of a location of the first wireless communication device, the transmitted data useable by the second wireless communication device in generating information usable in directing at least one of a person, vehicle, craft, or plane associated with the second mobile wireless communication device to the location of the first wireless communication device.

FIG. 10

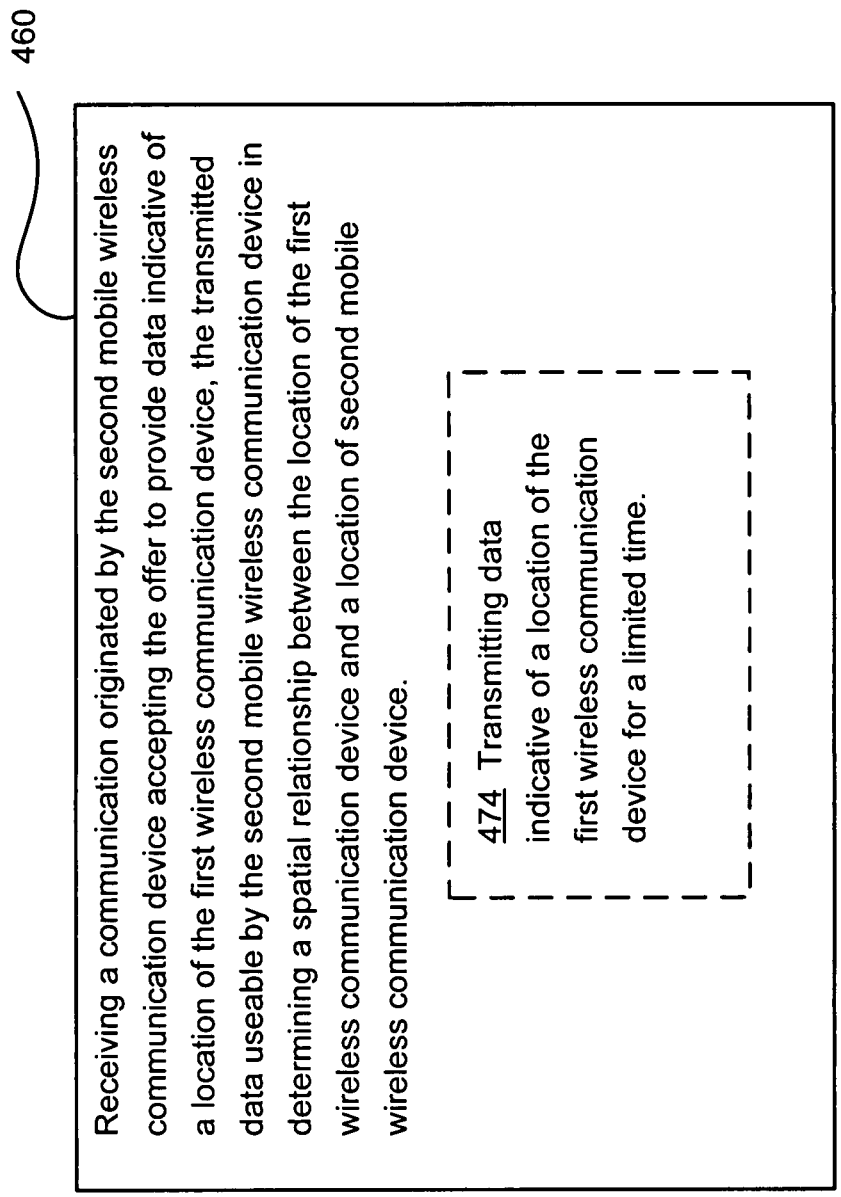

460

Receiving a communication originated by the second mobile wireless communication device accepting the offer to provide data indicative of a location of the first wireless communication device, the transmitted data useable by the second mobile wireless communication device in determining a spatial relationship between the location of the first wireless communication device and a location of second mobile wireless communication device.

474 Transmitting data indicative of a location of the first wireless communication device for a limited time.

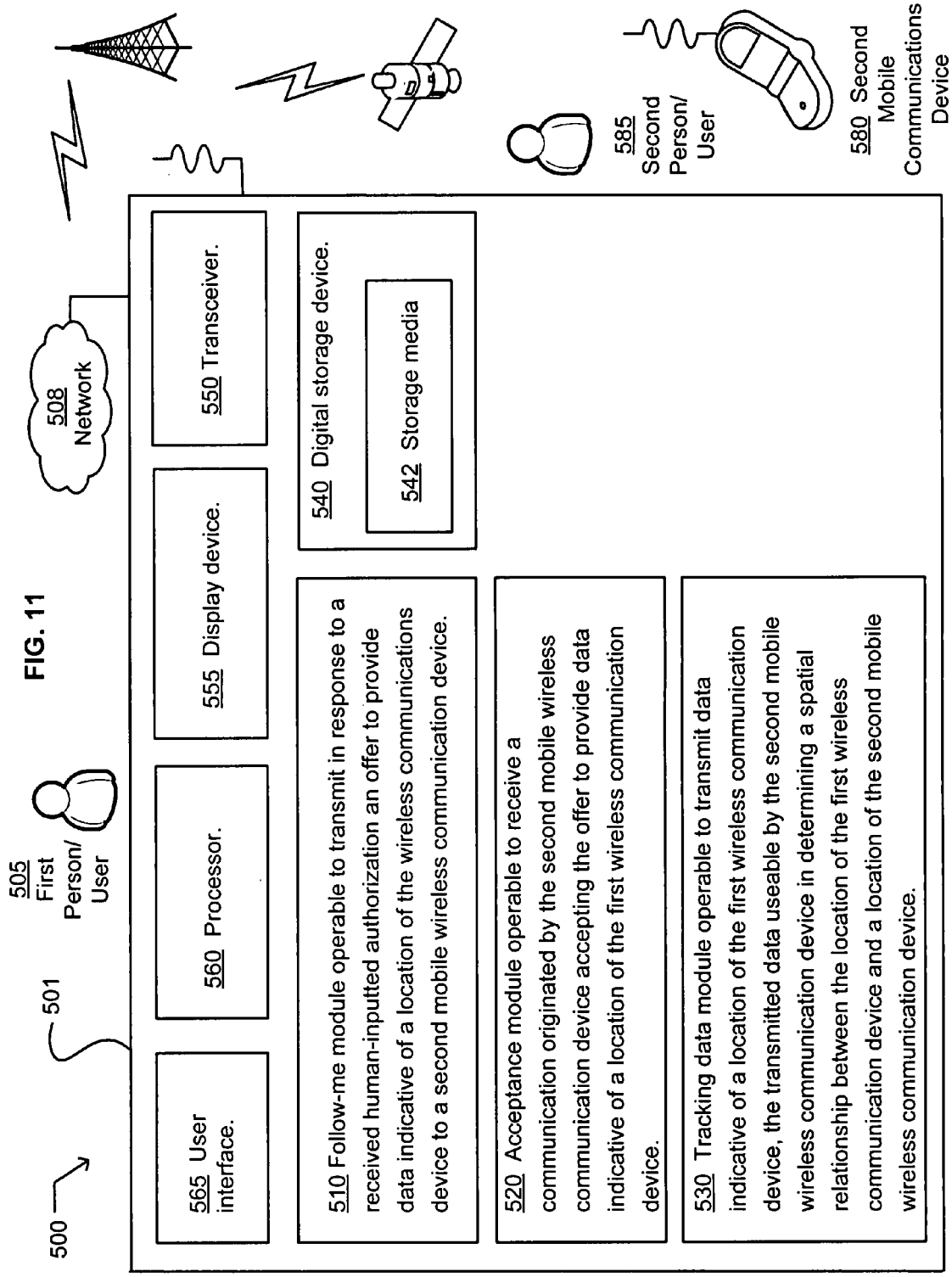

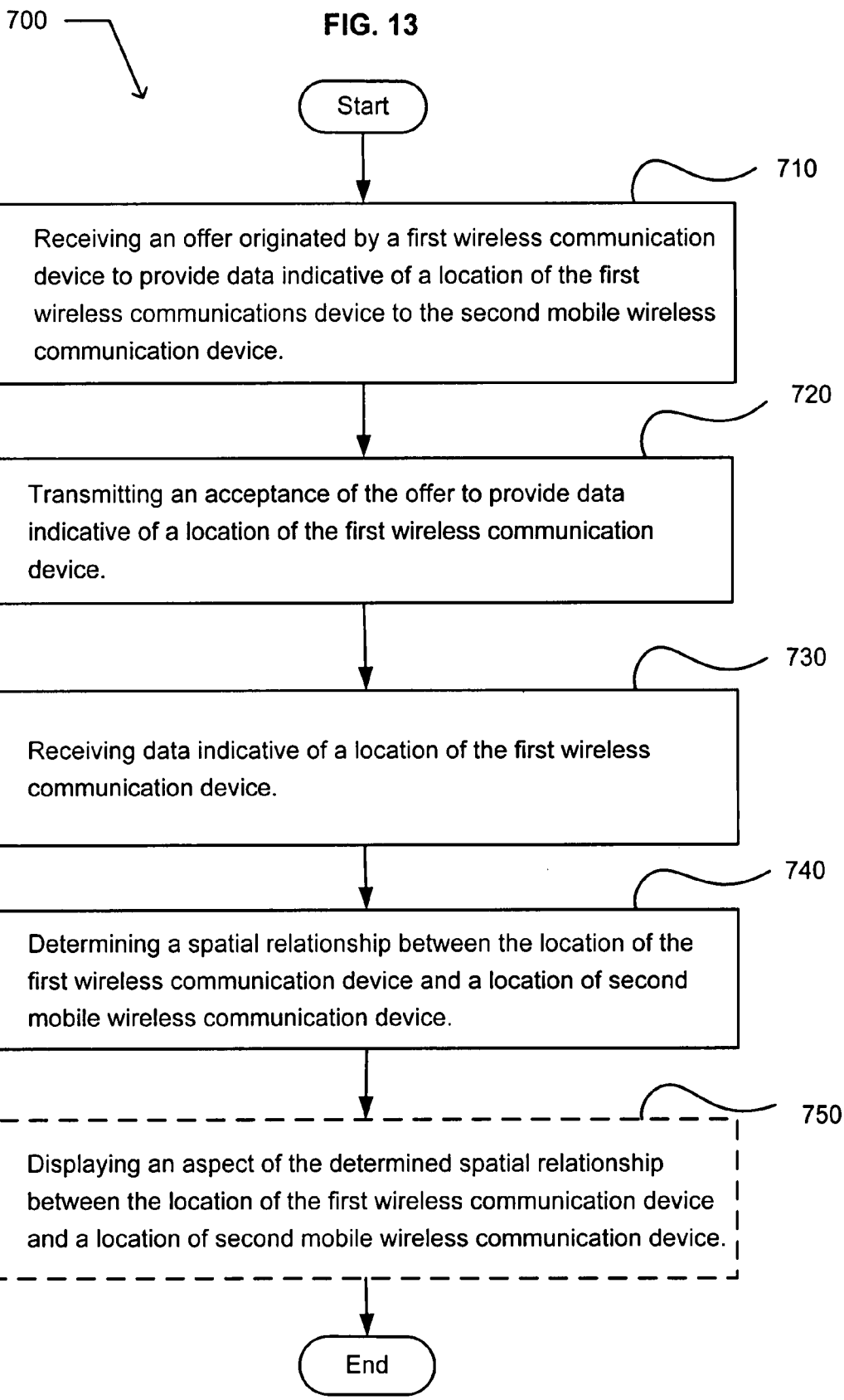

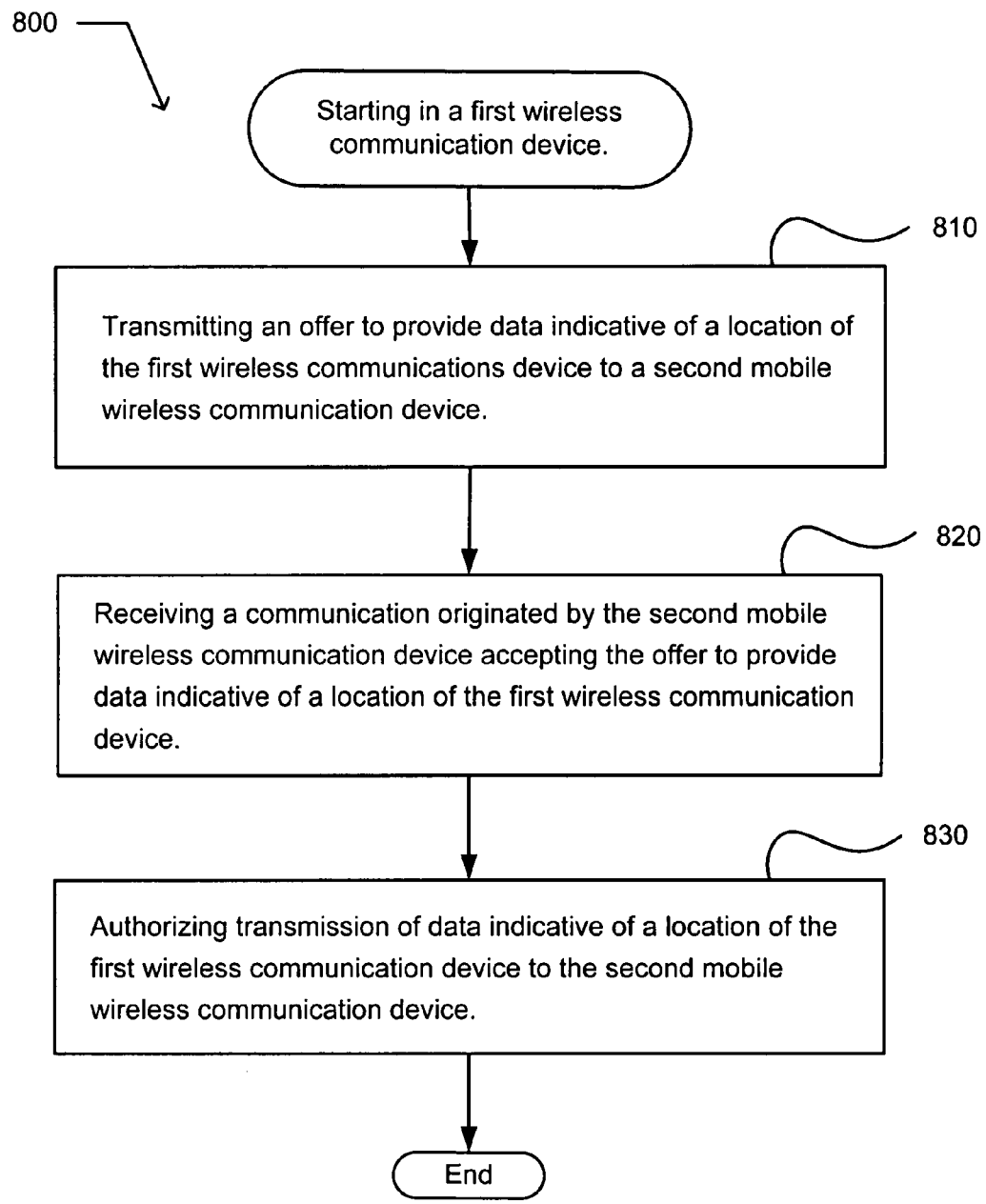

AUTHORIZED TRANSMISSION OF NAVIGATION ASSISTANCE

SUMMARY

An embodiment provides method. The method includes automatically providing data indicative of a location of a first mobile wireless communications device from the first mobile wireless communications device to a second mobile wireless communications device in response to respective human-user imitated authorizations exchanged between the two mobile wireless communications devices. In addition to the foregoing, other method embodiments are described in the claims, drawings, and text that form a part of the present application.

Another embodiment provides a method performed in a first wireless communication device. The method includes transmitting an offer to provide data indicative of a location of the first wireless communications device to a second mobile wireless communication device. The method also includes receiving a communication originated by the second mobile wireless communication device accepting the offer to provide data indicative of a location of the first wireless communication device. The method further includes transmitting data indicative of a location of the first wireless communication device. The transmitted data is useable by the second mobile wireless communication device in determining a spatial relationship between the location of the first wireless communication device and a location of the second mobile wireless communication device. In addition to the foregoing, other method embodiments are described in the claims, drawings, and text that form a part of the present application.

A further embodiment provides a first wireless communication device. The first wireless communication device includes a follow-me module operable to transmit in response to a received human-inputted authorization an offer to provide data indicative of a location of the wireless communications device to a second mobile wireless communication device. The first wireless communication device also includes an acceptance module operable to receive a communication originated by the second mobile wireless communication device accepting the offer to provide data indicative of a location of the first wireless communication device. The first wireless communication device further includes a tracking data module operable to transmit data indicative of a location of the first wireless communication device. The transmitted data is useable by the second mobile wireless communication device in determining a spatial relationship between the location of the first wireless communication device and a location of the second mobile wireless communication device. In addition to the foregoing, other device embodiments are described in the claims, drawings, and text that form a part of the present application.

An embodiment provides a wireless communication apparatus. The apparatus includes means for transmitting an offer to provide data indicative of a location of the wireless communications device to a second mobile wireless communication device. The apparatus also provides means for receiving a communication originated by the second mobile wireless communication device accepting the offer to provide data indicative of a location of the first wireless communication device. The apparatus further includes means for transmitting data indicative of a location of the first wireless communication device. The transmitted data is useable by the second mobile wireless communication device in determining a spatial relationship between the location of the first wireless communication device and a location of the second mobile wireless communication device. In addition to the foregoing, other apparatus embodiments are described in the claims, drawings, and text that form a part of the present application.

Another embodiment provides a method performed in a second wireless mobile communications device. The method includes receiving an offer originated by a first wireless communication device to provide data indicative of a location of the first wireless communications device to the second mobile wireless communication device. The method also includes transmitting an acceptance of the offer to provide data indicative of a location of the first wireless communication device. The method further includes receiving data originated by the first wireless communication device indicative of a location of the first wireless communication device. The method also includes determining a spatial relationship between the location of the first wireless communication device and a location of the second mobile wireless communication device. In addition to the foregoing, other method embodiments are described in the claims, drawings, and text that form a part of the present application.

A further embodiment provides a method performed in a first wireless communication device. The method includes transmitting an offer to provide data indicative of a location of the first wireless communications device to a second mobile wireless communication device. The method also includes receiving a communication originated by the second mobile wireless communication device accepting the offer to provide data indicative of a location of the first wireless communication device. The method further includes authorizing transmission of data indicative of a location of the first wireless communication device to the second mobile wireless communication device. In addition to the foregoing, other method embodiments are described in the claims, drawings, and text that form a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 illustrates an example of an operational flow performed in a first wireless communication device;

FIG. 6 illustrates an alternative embodiment of the operational flow described in conjunction with FIG. 5;

FIG. 9 illustrates an alternative embodiment of the operational flow described in conjunction with FIG. 5;

FIG. 10 illustrates another alternative embodiment of the operational flow described in conjunction with FIG. 5;

FIG. 11 illustrates an example system;

FIG. 13 illustrates an example operational flow implemented in a second wireless mobile communications device; and FIG. 14 illustrates an example operational flow performed in a first wireless communication device.

DETAILED DESCRIPTION

Figure 1:
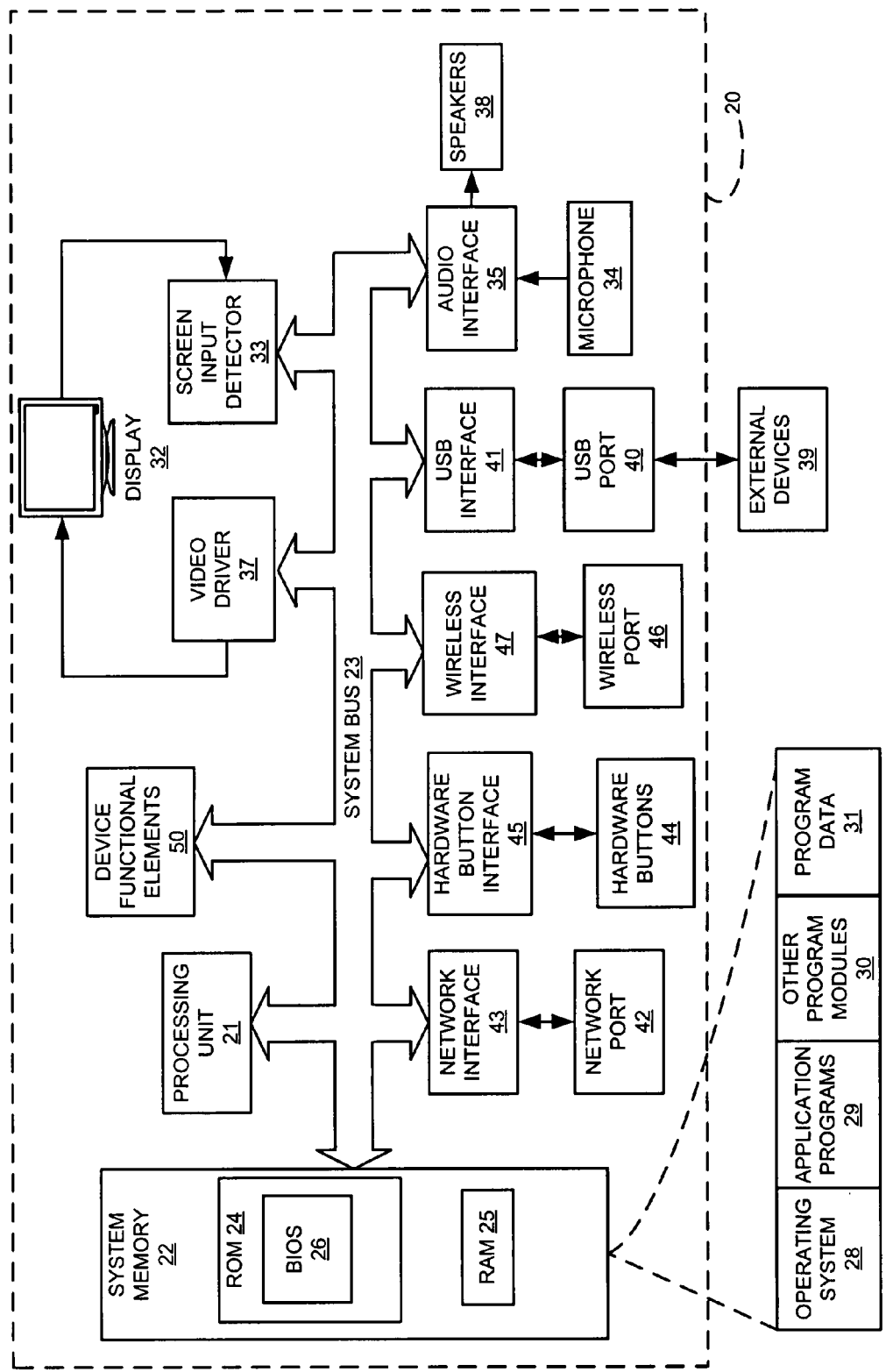
FIG. 1 illustrates an exemplary embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 and the following discussion are intended to provide a brief, general description of an environment in which embodiments may be implemented. FIG. 1 illustrates an exemplary system that includes a thin computing device 20, which may be included in an electronic device that also includes a device functional element 50. For example, the electronic device may include any item having electrical and/or electronic components playing a role in a functionality of the item, such as a limited resource computing device, a wireless communication device, a mobile wireless communication device, an electronic pen, a handheld electronic writing device, a digital camera, a scanner, an ultrasound device, an x-ray machine, a non-invasive imaging device, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and is coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 2:
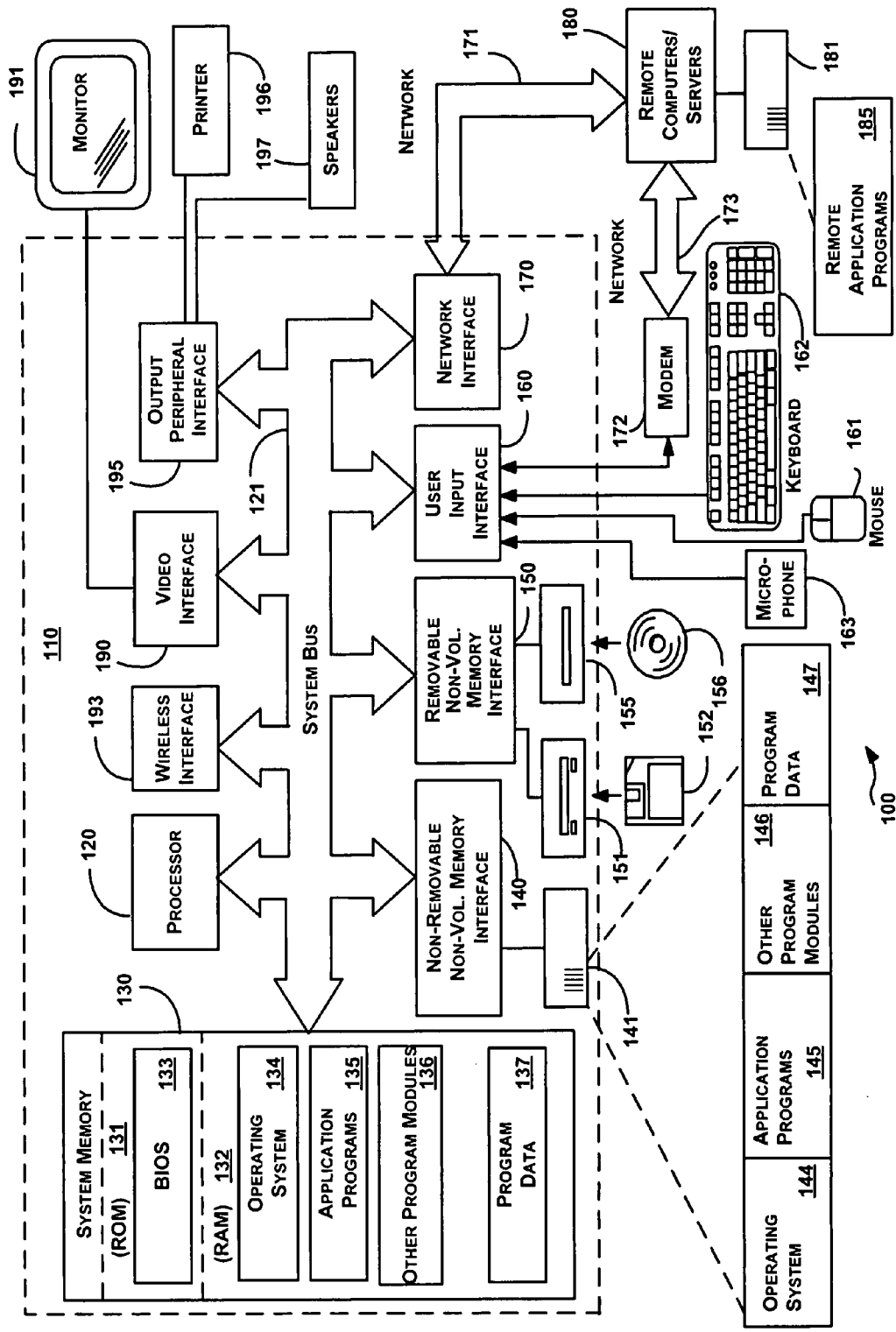
FIG. 2 illustrates an exemplary embodiment of a general-purpose computing system in which embodiments may be implemented.

FIG. 2 illustrates an exemplary embodiment of a general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, and/or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, and/or is coupled to an optical disk drive 155 that reads from and writes to a removable, non-volatile optical disk 156, such as a CD ROM. Other removable/nonremovable, volatile/non-volatile computer storage media that can be used in the exemplary operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, and/or the wireless interface 193. The network may include a LAN network environment, and/or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing communications link between the computers may be used.

Figure 3:
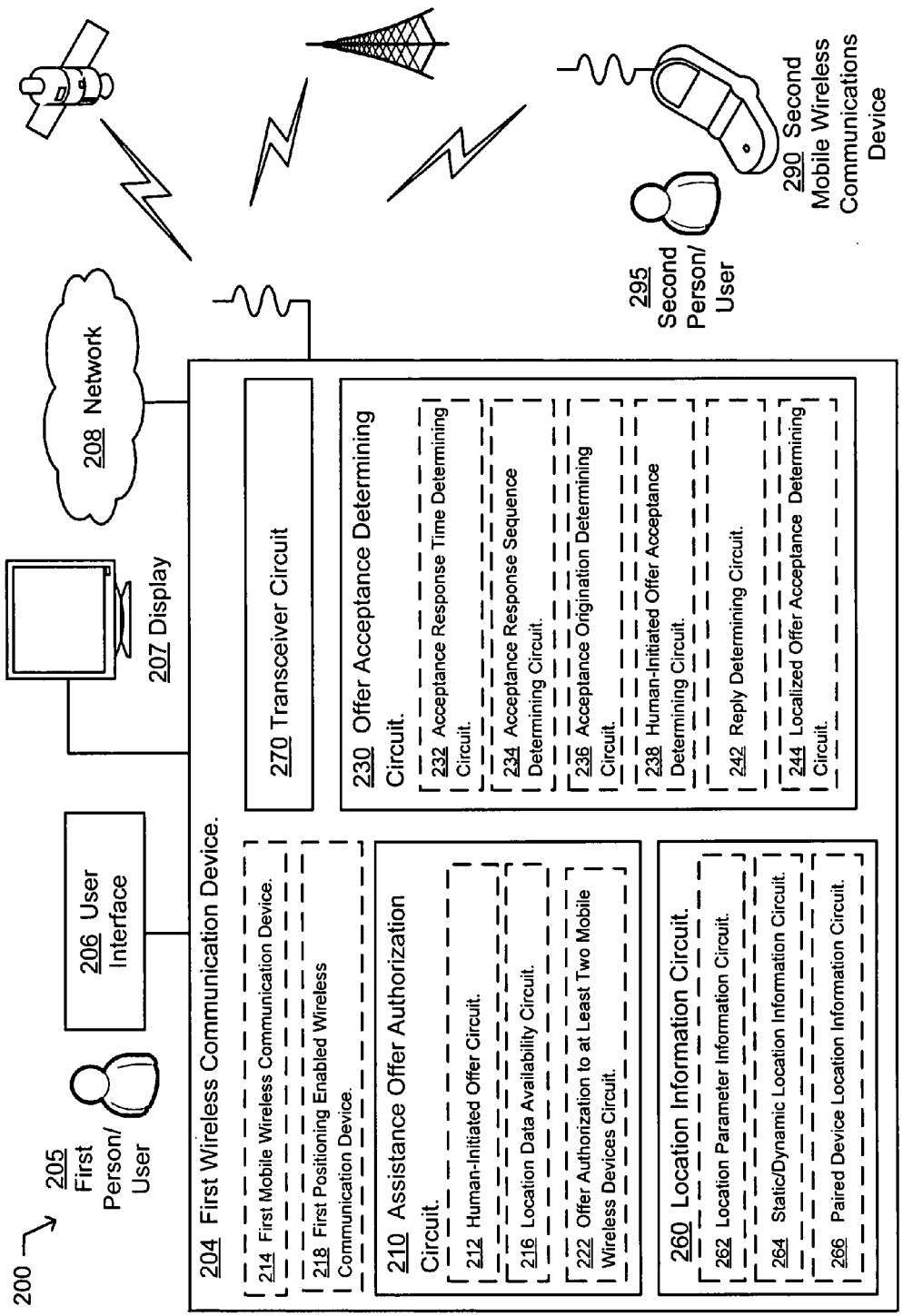
FIG. 3 illustrates an exemplary system in which embodiments may be implemented.

FIG. 3 illustrates an example system 200 in which embodiments may be implemented. The example system includes a first wireless communications device 204, a user interface 206, a display 207, and wireless access to at least one other wireless communication device, illustrated as a second mobile wireless mobile communications device 290. The user interface may be physically incorporated with the device, or may be physically separate from the device and electronically coupled with the device. The display 207 may be physically incorporated with the device, or may be physically separate from the device and electronically coupled with the device. In an alternative embodiment, the device is also coupled to a network 208 via a wireless link, a satellite link, and/or a wired link.

In an embodiment, the first wireless communications device 204 includes a navigation assistance offer authorization circuit 210, an offer acceptance determining circuit 230, and a location information circuit 260. In some embodiments, one or more of the navigation assistance offer authorization circuit, the offer acceptance determining circuit, and/or the location information circuit may be structurally distinct from the remaining circuits. In an embodiment, the device or a portion of the device may be implemented in whole or in part using the thin computing device 20 described in conjunction with FIG. 1 and/or the computing device 110 described in conjunction with FIG. 2. In another embodiment, the device or a portion of the device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. A person 205 may via a user interface 206 use the device 204.

The first wireless communication device 204 may include at least one additional circuit. The at least one additional circuit may include a transceiver circuit 270. In addition, the first wireless communication device may include a processor (not illustrated), such as the processing unit 21 described in conjunction with FIG. 1, and/or the processor 120 described in conjunction with FIG. 2. In further addition, the first wireless communications unit may include a computer storage media (not illustrated). In an embodiment, the first wireless communication device may include a mobile wireless communication device 214, and/or a positioning enabled wireless communication device 218.

In an embodiment, the navigation assistance offer authorization circuit 210 may include at least one additional circuit. The at least one additional circuit may include a human-initiated offer circuit 212, a location data availability circuit 216, and/or an offer authorization to at least two mobile wireless devices circuit 222.

In another embodiment, the offer acceptance determining circuit 230 may include at least one additional circuit. The at least one additional circuit may include an acceptance response time determining circuit 232, an acceptance response sequence determining circuit 234, an acceptance origination determining circuit 236, a human-initiated offer acceptance determining circuit 238, a reply determining circuit 242, and/or localized offer acceptance determining circuit 244.

In a further embodiment, the location information circuit 260 may include at least one additional circuit. The at least one additional circuit may include a location parameter information circuit 262, a static/dynamic location information circuit 264, and/or a paired device location information circuit 266.

Figure 4:
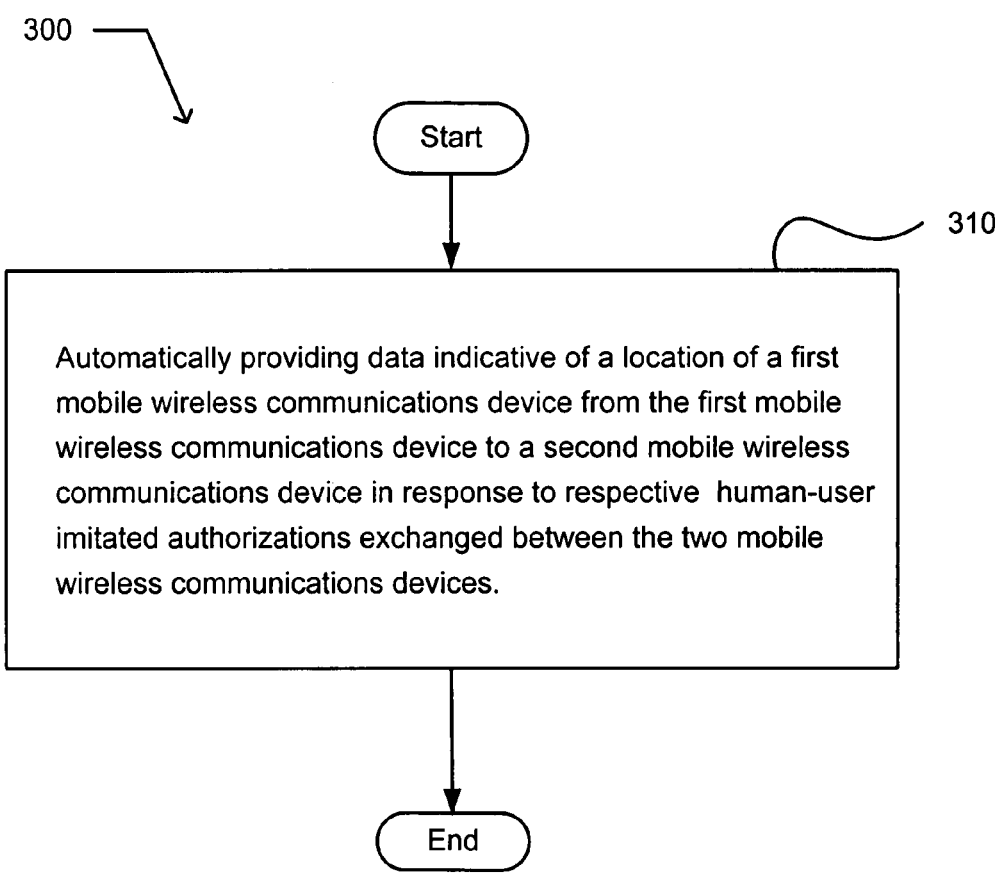
FIG. 4 illustrates an example of an operational flow.

FIG. 4 illustrates an example of an operational flow 300. FIG. 4 and several following figures may include various examples of operational flows, discussions, and explanations with respect to the above-described system 200 of FIG. 3, and/or with respect to other examples and contexts. However, it should be understood that the operational flows may be executed in a number of other environment and contexts, and/or in modified versions of FIG. 3. Also, although the various operational flows are illustrated in a sequence(s), it should be understood that the various operations may be performed in other orders than those which are illustrated, and/or may be performed concurrently.

After a start operation, the operational flow 300 includes automatically providing data indicative of a location of a first mobile wireless communications device from the first mobile wireless communications device to a second mobile wireless communications device in response to respective human-user imitated authorizations exchanged between the two mobile wireless communications devices. The operational flow then moves to an end operation.

In an alternative embodiment, the automatically providing data indicative of a location of a first mobile wireless communications device includes automatically and continuously providing for a period of time data indicative of a location of a first mobile wireless communications device. The period of time may include a fixed period of time, such as one hour, twelve hours, twenty-four, or some other measure of time. The period of time may include a determined time or a calculated time. For example, a determined time may include a time during which the location of the first mobile wireless communication device has not significantly changed, such as no significant location change for more than two hours. A calculated time may include a time when the first mobile wireless communication device and the second mobile wireless communication device have been within a 30-foot radius of each other for more than one hour. Upon the end of the period of time, the providing data indicative of a location of a first mobile wireless communications device ends.

In an embodiment, the automatically providing data indicative of a location of a first mobile wireless communications device may be implemented using the location information circuit 260 of FIG. 3. In another embodiment, the first mobile wireless communications device may be implemented using the first mobile wireless communications device 214. A first human-user initiated authorization may be implemented by the first person/user 205 providing an authorization input to the user interface 206, and by the navigation assistance offer authorization circuit 210 transmitting an offer of navigation assistance via the transceiver circuit 270 in a format and manner receivable by the second mobile wireless communications device 290. A second human-user initiated authorization may be implemented by the second person/user 295 providing an authorization input to a user interface (not shown) of the second mobile wireless communications device, and by the offer being transmitted by the second mobile wireless communications device in a format and manner receivable by the first wireless communications device 204. In an alternative embodiment, the respective human-user imitated authorizations exchanged between the two mobile wireless communications devices are exchanged contemporaneously. For example, in an embodiment, contemporaneously includes the first wireless communications device 204 and the second mobile wireless communications device 290 exchanging the respective human-user imitated authorizations within a five-minute window of time. In another embodiment, contemporaneously includes the first wireless communications device 204 and the second mobile wireless communications device 290 exchanging the respective human-user imitated authorizations within less than a one-minute window of time. In a further embodiment, contemporaneously includes the first wireless communications device 204 and the second mobile wireless communications device 290 exchanging the respective human-user imitated authorizations by a physical touching of the devices together. For example, the physical touching may include the second person/user holding the second mobile wireless communication device in their hand, and touching the second mobile wireless communication device to the first wireless communication device. In another example, both the first wireless communications device and the second mobile wireless communication may be handheld by their respective users and touched together.

FIG. 5 illustrates an example of an operational flow 400 performed in a first wireless communication device. FIG. 5 and several following figures may include various examples of operational flows, discussions, and explanations with respect to the above-described system 200 of FIG. 3, and/or with respect to other examples and contexts. However, it should be understood that the operational flows may be executed in a number of other environment and contexts, and/or in modified versions of FIG. 3. Also, although the various operational flows are illustrated in a sequence(s), it should be understood that the various operations may be performed in other orders than those which are illustrated, and/or may be performed concurrently.

After a start operation, the operational flow 400 includes an assistance offer operation 410. The assistance offer operation includes transmitting an offer to provide data indicative of a location of the first wireless communications device to a second mobile wireless communication device. In an embodiment, the first wireless communications device includes a stationary, a mobile, handheld, and/or vehicle borne first wireless communications device. In another embodiment, the second mobile wireless communications device includes a handheld, and/or vehicle borne first wireless communications device. The assistance offer operation may be implemented using the assistance offer authorization circuit 210 of FIG. 3. An authorization operation 430 receives a communication originated by the second mobile wireless communication device accepting the offer to provide data indicative of a location of the first wireless communication device. The authorization operation may be implemented using the offer acceptance determining circuit 230 of FIG. 3. A navigation assistance operation 460 transmits data indicative of a location of the first wireless communication device. The transmitted data is useable by the second mobile wireless communication device in determining a spatial relationship between the location of the first wireless communication device and a location of the second mobile wireless communication device. The navigation assistance operation may be implemented using the location information circuit 260 of FIG. 3. The operational flow then proceeds to an end operation.

FIG. 6 illustrates an alternative embodiment of the operational flow 400 described in conjunction with FIG. 5. The navigation assistance offer operation 410 may include at least one additional operation. The at least one additional operation may include an operation 412, an operation 414, an operation 416, an operation 418, and/or an operation 422. The operation 412 transmits in response to an authorization input received from a human user of the first wireless communication device an offer to provide data indicative of a location of the first wireless communications device to a second mobile wireless communication device. The operation 412 may be implemented using the human-initiated offer circuit 212 of FIG. 3. The operation 414 transmits from a first mobile wireless communications device an offer to provide data indicative of a location of the first mobile wireless communications device to a second mobile wireless communication device. The operation 414 may be implemented using the first mobile wireless communication device 214 of FIG. 3. The operation 416 transmits from a first wireless communications device an indication of availability to provide data indicative of a location of the first wireless communications device to a second mobile wireless communication device. The operation 416 may be implemented using the location data availability circuit 216 of FIG. 3.

The operation 418 transmits from a first positioning-enabled wireless communications device an offer to provide data indicative of a location of the first wireless communications device to a second mobile wireless communication device. In an embodiment, a positioning-enabled wireless communications device includes a communications device operable to at least one of know, determine, or receive from another source its position. For example, in an embodiment, a positioning-enabled wireless communications device is operable to obtain its position from a global positioning satellite system. In another embodiment, a positioning-enabled wireless communications device is operable to obtain its position from information obtained from its host network, such as a cell phone network operator. In a further embodiment, a positioning-enabled wireless communications device is operable to receive its position from its host network, such as a cell phone network operator. The operation 418 may be implemented using the first positioning-enabled wireless communication device 218 of FIG. 3.

The operation 422 transmits an offer to provide data indicative of a location of the first wireless communications device to a second mobile wireless communication device and to a third mobile wireless communications device. The operation 422 may be implemented using the offer authorization to at least two wireless devices circuit 222 of FIG. 3.

Figure 7:
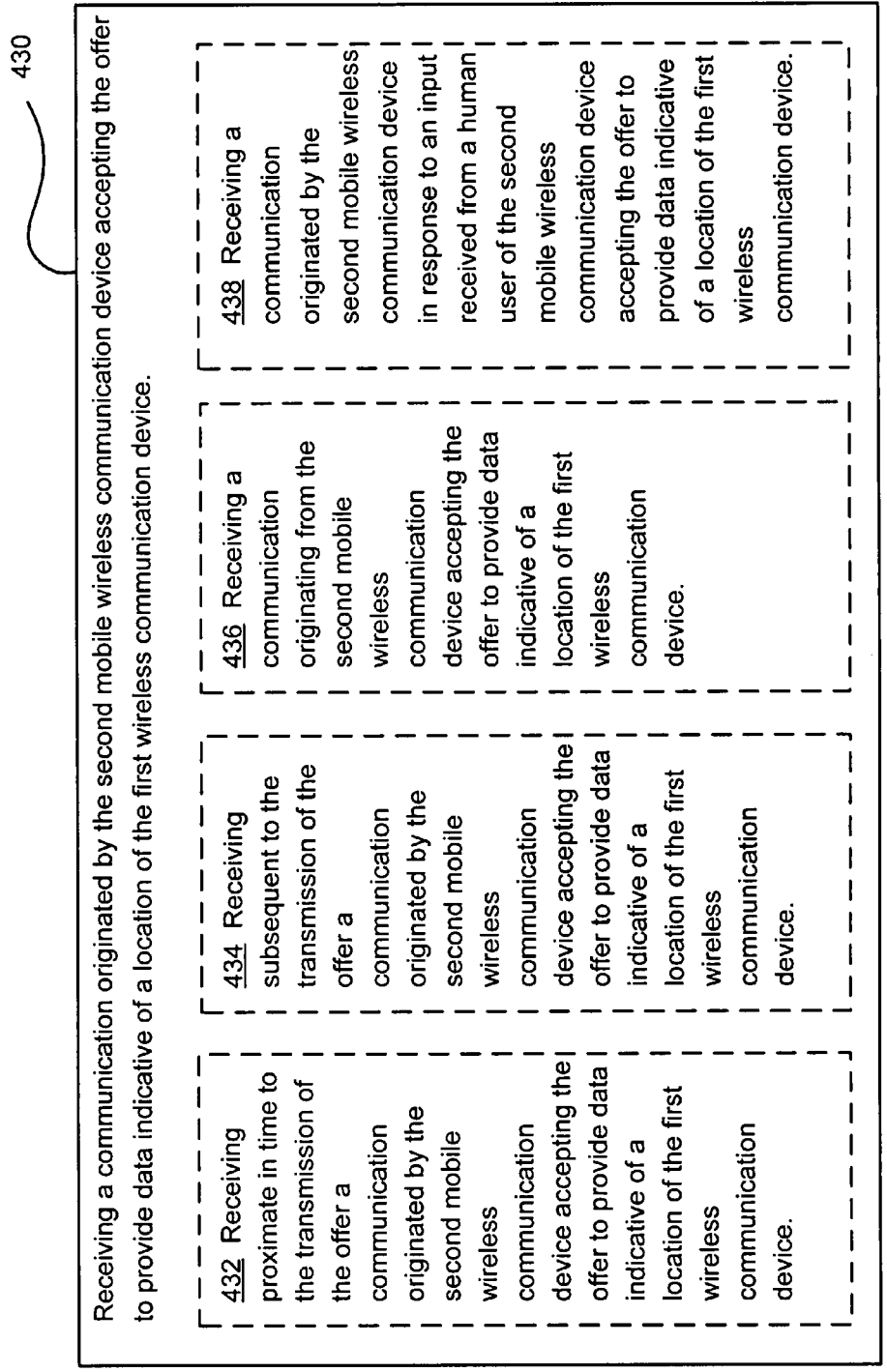
FIG. 7 illustrates another alternative embodiment of the operational flow described in conjunction with FIG. 5.

FIG. 7 illustrates another alternative embodiment of the operational flow 400 described in conjunction with FIG. 5. The authorization operation 430 may include at least one additional operation. The at least one additional operation may include an operation 432, an operation 434, an operation 436, and/or an operation 438. The operation 432 receives, proximate in time to the transmission of the offer, a communication originated by the second mobile wireless communication device accepting the offer to provide data indicative of a location of the first wireless communication device. In an embodiment, proximate in time includes close in time. For example, close in time includes separated by seconds, or minutes. The operation 432 may be implemented using the acceptance response time determining circuit 232 of FIG. 3. The operation 434 receives, subsequent to the transmission of the offer, a communication originated by the second mobile wireless communication device accepting the offer to provide data indicative of a location of the first wireless communication device. The operation 434 may be implemented using the acceptance response sequence determining circuit 234. The operation 436 receives a communication originating from the second mobile wireless communication device accepting the offer to provide data indicative of a location of the first wireless communication device. The operation 436 may be implemented using the acceptance origination determination circuit 236. The operation 438 receives a communication originated by the second mobile wireless communication device in response to an input received from a human user of the second mobile wireless communication device accepting the offer to provide data indicative of a location of the first wireless communication device. The operation 438 may be implemented using the human-initiated offer acceptance determination circuit 238.

Figure 8:
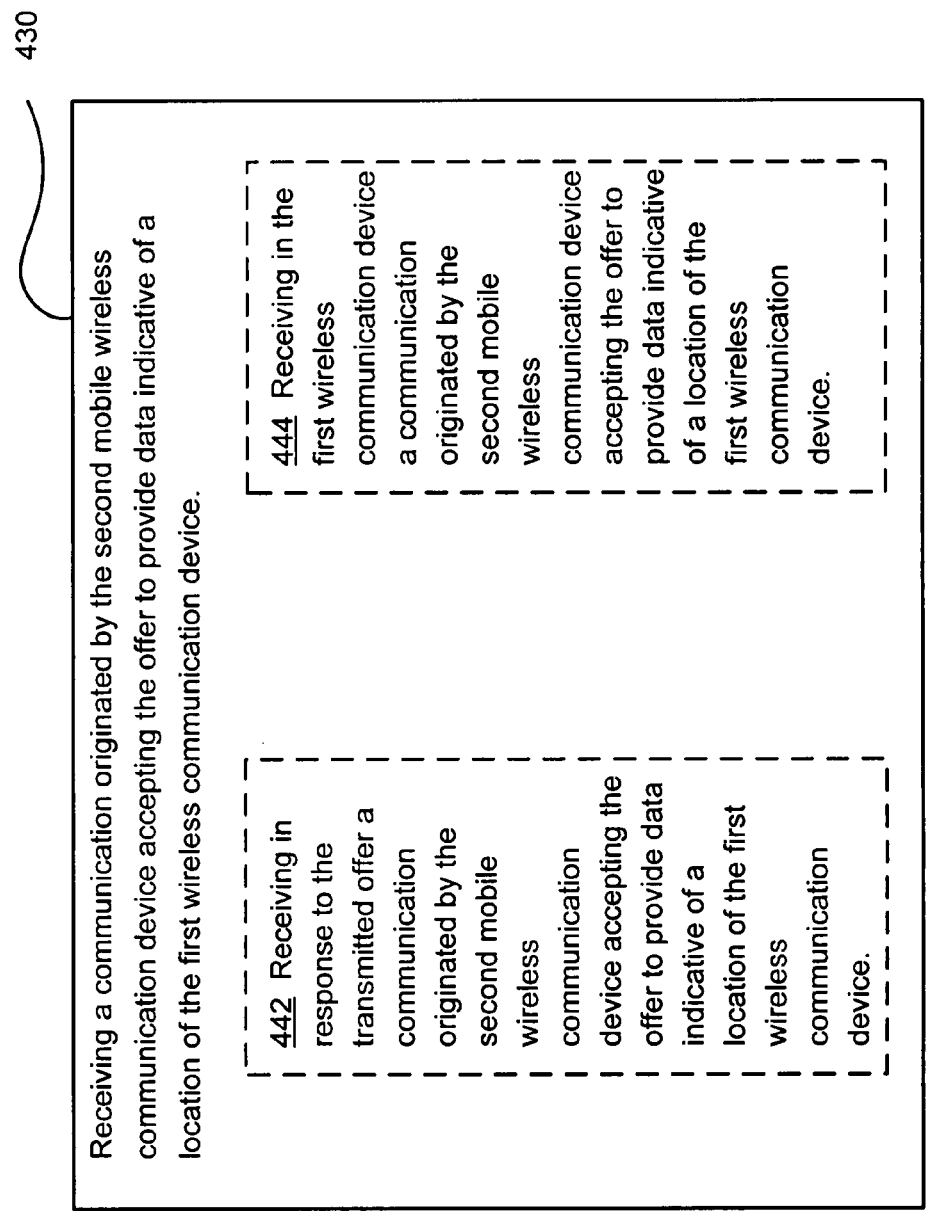
FIG. 8 illustrates a further alternative embodiment of the operational flow described in conjunction with FIG. 5.

FIG. 8 illustrates a further alternative embodiment of the operational flow 400 described in conjunction with FIG. 5. The authorization operation 430 may include at least one additional operation. The at least one additional operation may include an operation 442, and/or an operation 444. The operation 442 receives, in response to the transmitting the offer, a communication originated by the second mobile wireless communication device accepting the offer to provide data indicative of a location of the first wireless communication device. The operation 442 may be implemented using the reply determining circuit 242. The operation 444 receives in the first wireless communication device a communication originated by the second mobile wireless communication device accepting the offer to provide data indicative of a location of the first wireless communication device. The operation 444 may be implemented using the localized offer acceptance determination circuit 244.

FIG. 9 illustrates an alternative embodiment of the operational flow 400 described in conjunction with FIG. 5. The navigation assistance operation 460 may include at least one additional operation. The at least one additional operation may include an operation 462, an operation 464, an operation 466, an operation 468, and/or an operation 472. The operation 462 transmits data indicative of a position, a route, a speed, and/or a direction of the first wireless communication device. The operation 462 may be implemented using the location parameter information circuit 262 of FIG. 3. The operation 464 transmits data indicative of an at least substantially stationary location, or a moving location of the first wireless communication device. The operation 464 may be implemented using the static/dynamic location information circuit 264. The operation 466 transmits data indicative of a location of the first wireless communication device. The transmitted data is useable by the second mobile wireless communication device in displaying information indicative of a spatial relationship between the location of the first wireless communication device and a location of the second mobile wireless communication device. For example, the displaying information may include at least one of visually displaying the information or audibly displaying the information. The operation 466 may be implemented using the paired device location information circuit 266. The operation 468 transmits data indicative of a location of the first wireless communication device. The transmitted data being useable by the second wireless communication device in generating information usable in directing at least one of a person, vehicle, craft, or plane associated with the second mobile wireless communication device to a location proximate to the location of the first wireless communication device. The operation 468 may be implemented using the paired device location information circuit 266. The operation 472 transmits data indicative of a location of the first wireless communication device. The transmitted data is useable by the second wireless communication device in generating information usable in directing at least one of a person, vehicle, craft, or plane associated with the second mobile wireless communication device to the location of the first wireless communication device. For example, the information usable in directing at least one of a person, vehicle, craft, or plane associated with the second mobile wireless communication device may include a map indicating relative positions of both, a route, or directions. The operation 472 may be implemented using the paired device location information circuit 266.

FIG. 10 illustrates another alternative embodiment of the operational flow 400 described in conjunction with FIG. 5. The navigation assistance operation 460 may include at least one additional operation. The at least one additional operation may include an operation 474. The operation 474 transmits data indicative of a location of the first wireless communication device for a limited time.

FIG. 11 illustrates an example system 500. The system includes a first wireless communication device 501 that includes a follow-me module 510, an acceptance module 520, and a tracking module 530. In an embodiment, the wireless communication device may include at least one of a digital storage device 540, a transceiver 550, a display device 555, a processor 560, or a user interface 565.

The follow-me module 510 includes a follow-me module operable to transmit in response to a received human-inputted authorization an offer to provide data indicative of a location of the wireless communications device 501 to a second mobile wireless communication device 580. In an embodiment, the received human-inputted authorization includes receiving an inputted authorization by a first person/user 505 via a user interface 565. The acceptance module 520 is operable to receive a communication originated by the second mobile wireless communication device accepting the offer to provide data indicative of a location of the first wireless communication device. The tracking data module 530 includes a tracking data module operable to transmit data indicative of a location of the first wireless communication device. The transmitted data is useable by the second mobile wireless communication device in determining a spatial relationship between the location of the first wireless communication device and a location of the second mobile wireless communication device. In an alternative embodiment, the tracking data module includes a tracking data module operable to transmit data indicative of changes in location of the first wireless communication device. In an embodiment, the digital storage device 540 includes computer storage media, such as the computer storage media described in conjunction with FIG. 2.

Figure 12:
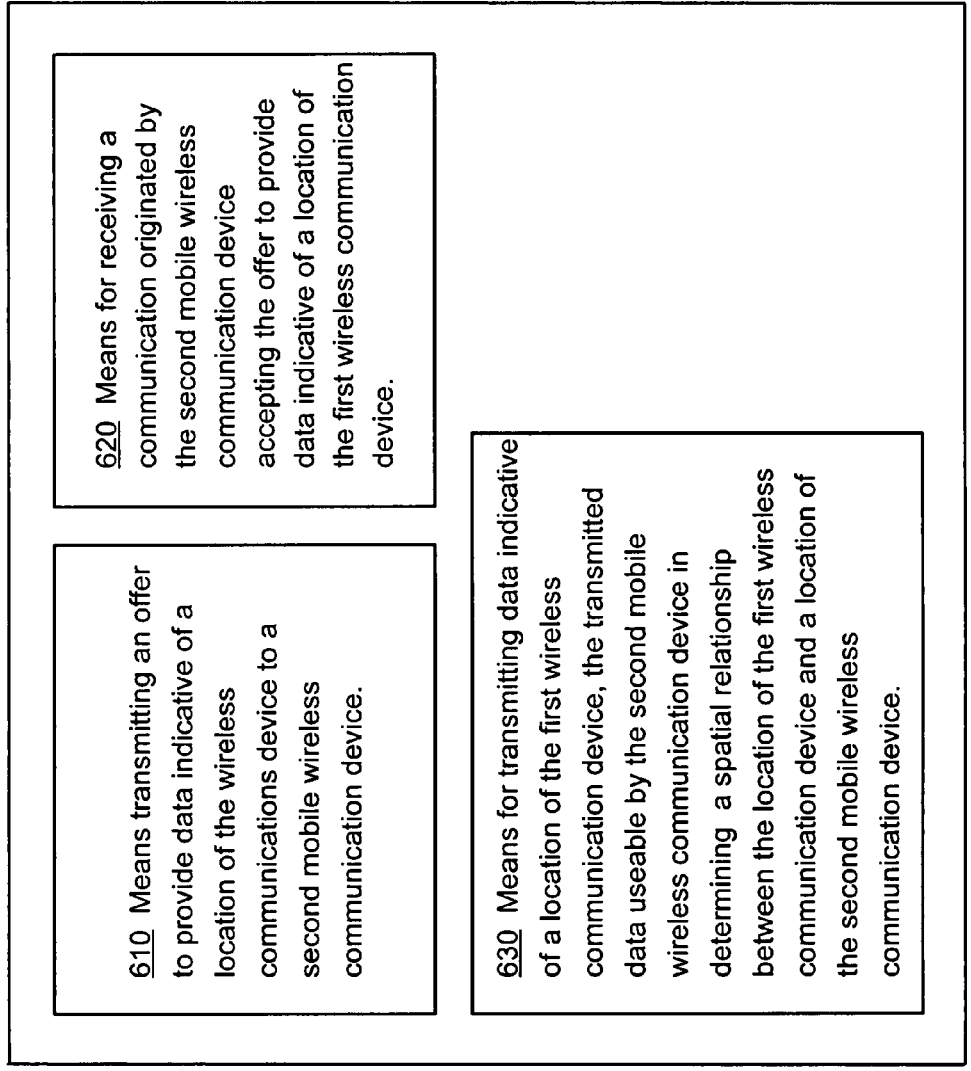
FIG. 12 illustrates an example wireless communications apparatus.

FIG. 12 illustrates an example wireless communications apparatus 600. The apparatus includes means 610 for transmitting an offer to provide data indicative of a location of the wireless communications device to a second mobile wireless communication device. The apparatus also include means 620 for receiving a communication originated by the second mobile wireless communication device accepting the offer to provide data indicative of a location of the first wireless communication device. The apparatus further includes means 630 for transmitting data indicative of a location of the first wireless communication device. The transmitted data is useable by the second mobile wireless communication device in determining a spatial relationship between the location of the first wireless communication device and a location of the second mobile wireless communication device.

FIG. 13 illustrates an example operational flow 700 implemented in a second wireless mobile communications device. After a start operation, the operational flow moves to a reception operation 710. The reception operation receives an offer originated by a first wireless communication device to provide data indicative of a location of the first wireless communications device to the second mobile wireless communication device. In an embodiment, the first wireless communication device may include at least one of a stationary, a mobile, handheld, or vehicle borne wireless communication device. In another embodiment, the second mobile wireless communication device may include at least one of a handheld, or vehicle borne mobile wireless communication device. A response operation 720 transmits an acceptance of the offer to provide data indicative of a location of the first wireless communication device. An acquisition operation 730 receives data indicative of a location of the first wireless communication device. In an alternative embodiment, the data indicative of a location of the first wireless communications device includes data originated by the first wireless communication device. In another alternative embodiment, the data indicative of a location of the first wireless communications device includes data originated by a network host for the first wireless communication device, such as a cell phone provider. A navigation operation 740 determines a spatial relationship between the location of the first wireless communication device and a location of the second mobile wireless communication device. The operational flow then moves to an end operation.

In an alternative embodiment, the operational flow 700 may include at least one additional operation, such as a user-assistance operation 750. The user-assistance operation displays an aspect of the determined spatial relationship between the location of the first wireless communication device and a location of the second mobile wireless communication device.

FIG. 14 illustrates an example operational flow 800 performed in a first wireless communication device. After a start operation performed in a first wireless communication device, the operational flow includes an availability announcement operation 810. The availability announcement operation transmits an offer to provide data indicative of a location of the first wireless communications device to a second mobile wireless communication device. A pairing operation 820 receives a communication originated by the second mobile wireless communication device accepting the offer to provide data indicative of a location of the first wireless communication device. An assistance operation 830 authorizes transmission of data indicative of a location of the first wireless communication device to the second mobile wireless communication device. For example, in an embodiment, the transmission of data indicative of a location of the first wireless communication device may be sourced from at least one of the first mobile wireless communication device, or a cellular communications network provider. The operational flow then moves to an end operation.

The foregoing detailed description has set forth various embodiments of the systems, apparatus, devices, computer program products, and/or processes using block diagrams, flow diagrams, operation diagrams, flowcharts, illustrations, and/or examples. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware. Those skilled in the art will recognize that optical aspects of implementations will typically employ optically-oriented hardware, software, and or firmware.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   exchanging one or more human-user initiated authorizations between a first wireless communications device and a second wireless communications device, the exchanging the one or more human-user initiated authorizations including at least transmitting from the first wireless communications device to the second wireless communications device an offer to provide data indicative of a location of the first wireless communications device, the exchanging one or more human-user initiated authorizations further including at least receiving at the first wireless communications device an affirmative reply to the offer, the affirmative reply being received within a predetermined time window relative to the offer; and
   automatically and periodically, in response to at least one of the one or more human-user initiated authorizations, providing data indicative of the location of the first wireless communications device from the first wireless communications device to the second wireless communications device at least for a limited period of time and within a predetermined radius of the first wireless communications device relative to a location of the second wireless communications device, and further including providing data indicative of at least a position, a route, a speed, and a direction of the first wireless communications device.

2. A first wireless communication device comprising:
   circuitry for transmitting from the first wireless communication device to a second wireless communication device an offer to provide data indicative of a location of the first wireless communication device;
   circuitry for receiving a communication originated by the second wireless communication device accepting the offer to provide data indicative of the location of the first wireless communication device, wherein the circuitry for receiving a communication is configured to receive the communication within a predetermined time window relative to the offer; and
   circuitry for transmitting data indicative of the location of the first wireless communication device, the circuitry for transmitting data configured to transmit data useable by the second wireless communication device for determining a spatial relationship between the location of the first wireless communication device and a location of the second wireless communication device, the circuitry for transmitting data further configured to automatically and periodically transmit the data indicative of the location of the first wireless communication device at least for a limited period of time and within a predetermined radius of the first wireless communication device relative to the location of the second wireless communication device, and the circuitry for transmitting data further configured to transmit data indicative of at least a position, a route, a speed, and a direction of the first wireless communication device.

3. The device of claim 2, wherein the circuitry for transmitting from the first wireless communication device to a second wireless communication device an offer to provide data indicative of a location of the first wireless communication device comprises:
   circuitry for transmitting from the first wireless communication device to the second wireless communication device, in response to an authorization input received via a user interface of the first wireless communication device an offer to provide data indicative of a location of the first wireless communication device.

4. The device of claim 2, wherein the circuitry for transmitting from the first wireless communication device to a second wireless communication device an offer to provide data indicative of a location of the first wireless communication device comprises:
   circuitry for transmitting from the first wireless communication device to the second wireless communication device, an indication of availability to provide data indicative of a location of the first wireless communication device.

5. The device of claim 2, wherein the circuitry for receiving a communication originated by the second wireless communication device accepting the offer to provide data indicative of the location of the first wireless communication device comprises:
   circuitry for receiving proximate in time to the transmission of the offer a communication originated by the second wireless communication device accepting the offer to provide data indicative of a location of the first wireless communication device.

6. The device of claim 2, wherein the circuitry for receiving a communication originated by the second wireless communication device accepting the offer to provide data indicative of the location of the first wireless communication device comprises:
   circuitry for receiving subsequent to the transmission of the offer a communication originated by the second wireless communication device accepting the offer to provide data indicative of a location of the first wireless communication device.

7. The device of claim 2, wherein the circuitry for receiving a communication originated by the second wireless communication device accepting the offer to provide data indicative of the location of the first wireless communication device comprises:
   circuitry for receiving a communication originated by the second wireless communication device responsive to input acquired via a user interface of the second wireless communication device accepting the offer to provide data indicative of a location of the first wireless communication device.

8. The device of claim 2, wherein the circuitry for receiving a communication originated by the second wireless communication device accepting the offer to provide data indicative of the location of the first wireless communication device comprises:
   circuitry for receiving in response to the transmitted offer a communication originated by the second wireless communication device accepting the offer to provide data indicative of a location of the first wireless communication device.

9. The device of claim 2, wherein the circuitry for receiving a communication originated by the second wireless communication device accepting the offer to provide data indicative of the location of the first wireless communication device comprises:
   circuitry for receiving in the first wireless communication device a communication originated by the second wireless communication device accepting the offer to provide data indicative of a location of the first wireless communication device.

10. The device of claim 2, wherein the circuitry for transmitting data indicative of the location of the first wireless communication device, comprises:
    circuitry for transmitting data indicative of at least one of a stationary location or a moving location of the first wireless communication device.

11. The device of claim 2, wherein the circuitry for transmitting data indicative of the location of the first wireless communication device, the circuitry for transmitting data further configured to transmit data useable by the second wireless communication device for determining a spatial relationship between the location of the first wireless communication device and a location of the second wireless communication device, comprises:
    circuitry for transmitting data configured to be useable by the second wireless communication device for displaying information indicative of a spatial relationship between the location of the first wireless communication device and the location of the second wireless communication device.

12. The device of claim 2, wherein the circuitry for transmitting data indicative of the location of the first wireless communication device, the circuitry for transmitting data configured to transmit data useable by the second wireless communication device for determining a spatial relationship between the location of the first wireless communication device and a location of the second wireless communication device, comprises:
    circuitry for transmitting data configured to be useable by the second wireless communication device in generating information usable for directing at least one of a person, vehicle, craft, or plane associated with the second wireless communication device to a location proximate to the location of the first wireless communication device.

13. The device of claim 2, wherein the circuitry for transmitting data indicative of the location of the first wireless communication device, the circuitry for transmitting data configured to transmit data useable by the second wireless communication device for determining a spatial relationship between the location of the first wireless communication device and a location of the second wireless communication device, comprises:
    circuitry for transmitting data configured to be useable by the second wireless communication device in generating information usable for directing at least one of a person, vehicle, craft, or plane associated with the second wireless communication device to the location of the first wireless communication device.

14. The device of claim 2, wherein the circuitry for transmitting data indicative of the location of the first wireless communication device, the circuitry for transmitting data configured to transmit data useable by the second wireless communication device for determining a spatial relationship between the location of the first wireless communication device and a location of the second wireless communication device, the circuitry for transmitting data further configured to automatically and periodically transmit the data indicative of the location of the first wireless communication device at least for a limited period of time and within a predetermined radius of the first wireless communication device relative to the location of the second wireless communication device, and the circuitry for transmitting data further configured to transmit data indicative of at least a position, a route, a speed, and a direction of the first wireless communication device, comprises:

circuitry for automatically and periodically transmitting the data indicative of a location of the first wireless communication device at least until an end of a limited period of time that includes at least one of a predetermined period of time during which a location of the first wireless communication device is unchanged or a predetermined period of time during which the first communication device and the second communication device are within a predetermined distance of each other.

15. The device of claim 2, wherein the circuitry for transmitting from the first wireless communication device to a second wireless communication device an offer to provide data indicative of a location of the first wireless communication device comprises:

circuitry for transmitting from the first wireless communication device to the second wireless communication device, an offer to provide data indicative of a location of the first wireless communication device to the second wireless communication device and to a third wireless communication device.

16. The device of claim 2, wherein the circuitry for transmitting data indicative of the location of the first wireless communication device, the circuitry for transmitting data configured to transmit data useable by the second wireless communication device for determining a spatial relationship between the location of the first wireless communication device and a location of the second wireless communication device, comprises:

circuitry for transmitting data configured to be audibly presented by the second wireless communication device to audibly indicate information indicative of a spatial relationship between the location of the first wireless communication device and the location of the second wireless communication device.

17. The system of claim 2, wherein the circuitry for transmitting data indicative of the location of the first wireless communication device, the circuitry for transmitting data configured to transmit data useable by the second wireless communication device for determining a spatial relationship between the location of the first wireless communication device and a location of the second wireless communication device, the circuitry for transmitting data further configured to automatically and periodically transmit the data indicative of the location of the first wireless communication device at least for a limited period of time and within a predetermined radius of the first wireless communication device relative to the location of the second wireless communication device, and the circuitry for transmitting data further configured to transmit data indicative of at least a position, a route, a speed, and a direction of the first wireless communication device comprises:

circuitry configured for transmitting the data indicative of the location of the first wireless communication device periodically by at least transmitting the data at least one of continuously or at pre-defined intervals.

18. The system of claim 17, wherein the circuitry configured for transmitting the data indicative of the location of the first wireless communication device periodically by at least transmitting the data at least one of continuously or at pre-defined intervals comprises:

circuitry for transmitting the data indicative of the location of the first wireless communication device at predefined intervals wherein the prefined intervals include at least one of variable or regular intervals.

19. The system of claim 2, wherein the circuitry for transmitting data indicative of the location of the first wireless communication device, the circuitry for transmitting data configured to transmit data useable by the second wireless communication device for determining a spatial relationship between the location of the first wireless communication device and a location of the second wireless communication device, the circuitry for transmitting data further configured to automatically and periodically transmit the data indicative of the location of the first wireless communication device at least for a limited period of time and within a predetermined radius of the first wireless communication device relative to the location of the second wireless communication device, and the circuitry for transmitting data further configured to transmit data indicative of at least a position, a route, a speed, and a direction of the first wireless communication device comprises:

circuitry configured to transmit data indicative of at least a position of the first wireless communication device by at least transmitting data indicative of a position of the first wireless communication device relative to at least one of a map or a geographic area.

20. The system of claim 2, wherein the circuitry for transmitting data indicative of the location of the first wireless communication device, the circuitry for transmitting data configured to transmit data useable by the second wireless communication device for determining a spatial relationship between the location of the first wireless communication device and a location of the second wireless communication device, the circuitry for transmitting data further configured to automatically and periodically transmit the data indicative of the location of the first wireless communication device at least for a limited period of time and within a predetermined radius of the first wireless communication device relative to the location of the second wireless communication device, and the circuitry for transmitting data further configured to transmit data indicative of at least a position, a route, a speed, and a direction of the first wireless communication device comprises:

circuitry configured to transmit data indicative of at least a direction of the first wireless communication device by at least transmitting data indicative of a direction of movement of the first wireless communication device.

21. A first wireless communication device comprising:

a follow-me module configured to transmit, from the first wireless communication device to a second wireless communication device, in response to an authorization acquired via a user input interface of the first wireless communication device, an offer to provide data indicative of a location of the first wireless communication device to the second wireless communication device;

an acceptance module configured to receive a communication originated by the second wireless communication device accepting the offer to provide data indicative of the location of the first wireless communication device, wherein the acceptance module is configured to receive the communication within a predetermined time window relative to the offer; and a tracking data module configured to automatically and periodically transmit data indicative of the location of the first wireless communication device at least for a limited period of time and within a predetermined radius of the first wireless communication device relative to a location of the second wireless communication device, and the tracking data module further configured to transmit data indicative of at least a position, a route, a speed, and a direction of the first wireless communication device, the tracking date module further configured to transmit data useable by the second wireless communication device in determining a spatial relationship between the location of the first wireless communication device and the location of the second wireless communication device.

22. The wireless communication device of claim 21, wherein the tracking data module comprises:
a tracking data module configured to transmit data indicative of changes in location of the first wireless communication device.

23. A wireless communication device comprising:
means for transmitting an offer to provide data indicative of a location of the wireless communication device from the wireless communication device to a second wireless communication device;
means for receiving a communication originated by the second wireless communication device accepting the offer to provide data indicative of the location of the wireless communication device, wherein the means for receiving a communication is configured to receive the communication within a predetermined time window relative to the offer; and
means for automatically and periodically transmitting data indicative of the location of the wireless communication device at least for a limited period of time and within a predetermined radius of the wireless communication device relative to a location of the second wireless communication device, the means for automatically and periodically transmitting data configured to transmit data indicative of at least a position, a route, a speed, and a direction of the wireless communication device, the means for automatically and periodically transmitting data further configured to transmit data useable by the second wireless communication device for determining a spatial relationship between the location of the wireless communication device and the location of the second wireless communication device.

24. A method comprising:
receiving an offer at a second wireless communications device, the offer being transmitted to the second wireless communications device by a first wireless communications device, the offer including at least offering to automatically and periodically provide data indicative of a location of the first wireless communications device to the second wireless communications device at least for a limited period of time and within a predetermined radius of the first wireless communications device relative to a location of the second wireless communications device, and the offer further including at least offering to provide data indicative of at least a position, a route, a speed, and a direction of the first wireless communications device;
transmitting an acceptance of the offer to provide data indicative of the location of the first wireless communications device, including at least transmitting the acceptance within a predetermined time window relative to the receiving of the offer;
receiving data indicative of the location of the first wireless communications device; and
determining a spatial relationship between the location of the first wireless communications device and the location of the second wireless communications device.

25. The method of claim 24, further comprising:
displaying an aspect of the determined spatial relationship between the location of the first wireless communications device and the location of the second wireless communications device.

26. The method of claim 24, further comprising:
creating an acceptance of the offer transmitted from the first wireless communication device to the second wireless communication device, the creating of the acceptance being performed with the second wireless communications device in response to user input acquired at least partly via a user interface of the second wireless communications device.

27. The method of claim 24, wherein the receiving data indicative of the location of the first wireless communications device comprises:
receiving data indicative of at least one of a stationary location or a moving location of the first wireless communication device.

28. The method of claim 24, wherein the receiving data indicative of the location of the first wireless communications device comprises:
receiving data useable by the second wireless communication device for displaying information indicative of a spatial relationship between the location of the first wireless communication device and the location of the second wireless communication device.

29. The method of claim 24, wherein the receiving data indicative of the location of the first wireless communications device comprises:
receiving data useable by the second wireless communication device in generating information usable for directing at least one of a person, vehicle, craft, or plane associated with the second wireless communication device to a location proximate to the location of the first wireless communication device.

30. The method of claim 24, wherein the receiving data indicative of the location of the first wireless communications device comprises:
receiving data useable by the second wireless communication device in generating information usable for directing at least one of a person, vehicle, craft, or plane associated with the second wireless communication device to the location of the first wireless communication device.

31. A method comprising:
transmitting from a first wireless communication device to a second wireless communication device an offer to provide data indicative of a location of the first wireless communication device;
receiving a communication originated by the second wireless communication device accepting the offer to provide data indicative of the location of the first wireless communication device, including at least receiving the communication within a predetermined time window relative to the offer;
authorizing transmission of data indicative of the location of the first wireless communication device to the second wireless communication device;
transmitting data indicative of the location of the first wireless communication device to the second wireless communication device, the transmitting of the data being performed automatically and periodically at least for a limited period of time and within a predetermined radius of the first wireless communication device relative to a location of the second wireless communication device, and the transmitting further including transmitting data indicative of at least a position, a route, a speed, and a direction of the first wireless communication device.

32. A method comprising:

transmitting from a first wireless communication device to a second wireless communication device an offer to provide data indicative of a location of the first wireless communication device;

receiving a communication originated by the second wireless communication device accepting the offer to provide data indicative of the location of the first wireless communication device, including at least receiving the communication within a predetermined time window relative to the offer; and transmitting data indicative of the location of the first wireless communication device, the transmitting of the data being performed automatically and periodically at least for a limited period of time and within a predetermined radius of the first wireless communication device relative to a location of the second wireless communication device, and the transmitting of the data further including at least transmitting data indicative of at least a position, a route, a speed, and a direction of the first wireless communication device, the transmitted data useable by the second wireless communication device in determining a spatial relationship between the location of the first wireless communication device and the location of the second wireless communication device.

\* \* \* \* \*